J. H. De Poe.,

Meat Cutter.

No. 104,940. Patented July 5, 1870.

Witnesses:

Inventor:
J. H. De Poe
Per Munn & Co
Attorneys.

United States Patent Office.

JAMES H. DE POE, OF BOONTON, NEW JERSEY.

Letters Patent No. 104,940, dated July 5, 1870.

IMPROVED MEAT-CHOPPER.

The Schedule referred to in these Letters Patent and making part of the same.

*To all whom it may concern:*

Be it known that I, JAMES H. DE POE, of Boonton, in the county of Morris and State of New Jersey, have invented a new and useful Improvement in Meat-Choppers; and I do hereby declare that the following is a full, clear, and exact description thereof, which will enable others skilled in the art to make and use the same, reference being had to the accompanying drawing forming a part of this specification.

This invention relates to improvements in hand meat-choppers, and consists in the arrangement of the meat-holding vessel, and the operating gear for the cutters, on a platform side by side, and in working the cutter, which is molded on a bent arm pivoted to the said platform, and the pawl for turning the meat-holder by one crank on a short shaft, provided with a balance-wheel, and driven by a large wheel and pinion, substantially as hereinafter specified.

Figure 1:
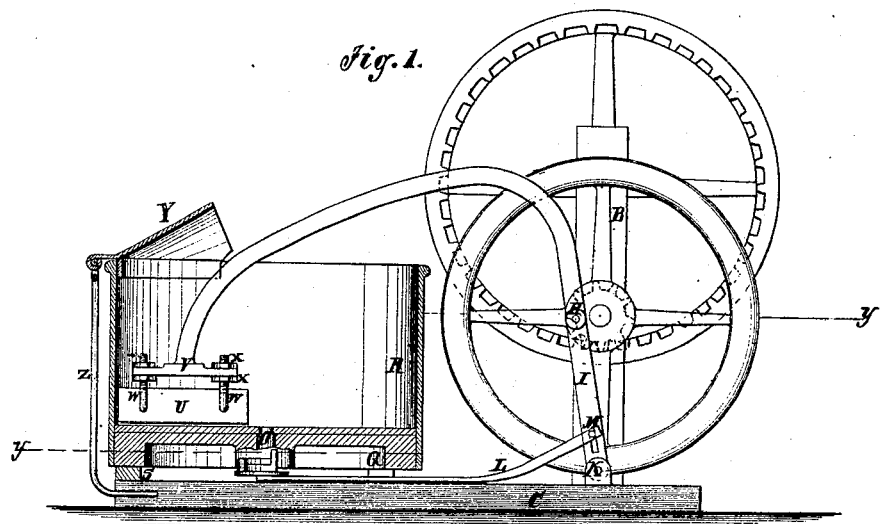
Figure 2:
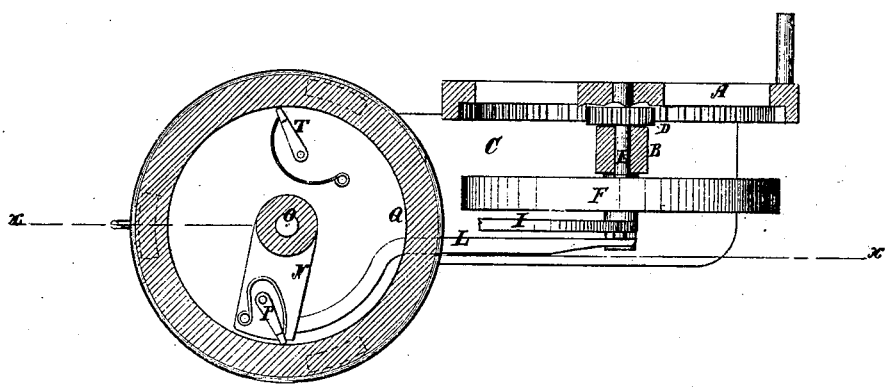

Figure 1 is a sectional elevation of my improved meat-chopper, the section being taken on the line $x\ x$ of fig. 2, and Figure 2 is a horizontal section, taken on the line $y\ y$ of fig. 1.

Similar letters of reference indicate corresponding parts.

A is the driving-wheel, mounted on a post, B, supported in the platform C, near one end.

The wheel A gears with a pinion, D, on a shaft, E, also mounted on the said post, and carrying a balance-wheel, F; also, a crank, G, the latter at the end opposite the one having the pinion D.

The wrist-pin H of this crank works in a slot in the bent cutter-arm I, pivoted to the platform C at K, and vibrates the said arm, which is so shaped that an up and down motion is imparted to the end which carries the cutter.

L is a pawl-arm, pivoted at one end to the arm I, and the other end is connected to a pawl-carrying arm, N, arranged on the axial stud O of the meat-holder R, and carrying the spring friction-pawl P, which acts on the inside of a smooth rim, Q, attached to the bottom of the meat-holder, and revolving on a circular supporting-ring, S.

T is a holding spring pawl.

The cutter U is attached to the cutter-head V by bolts W, having nuts X on each side of the head, by which the edge of the cutter may be made parallel with the bottom of the meat-holder, as required.

I propose to use one or more cutters and cutter-arms, and to cause them to strike alternately, by doubling the cranks.

Y represents a cover or guard for that part of the meat-holder where the cutters work, to prevent the meat being thrown out. It is suspended on a support, Z, mounted in the platform C, and hinged to the said support, so that it may be turned out of the way when it is required to remove the meat-holders.

It will be seen that this arrangement provides a very simple and cheap apparatus, which may be made with but little expensive fitting.

I propose to employ any arrangement of ratchets and pawls for imparting the intermittent rotary motion to the meat-holder.

Having thus described my invention,

What I claim as new, and desire to secure by Letters Patent, is—

1. The combination and arrangement of the meat-holder R, platform C, cutter, cutter-arm, and driving-gear, substantially as specified.

2. The arrangement, with the bent cutter-arm pivoted to the platform C, and connected to the crank-shaft, as described, of the pawl-arm L, substantially as specified.

3. Operating the cutter, and the pawl for turning the meat-holder, by one and the same crank, substantially in the manner herein described.

4. The combination, with the meat-holder and the cutter, of the guard Y, arranged substantially as specified.

The above specification of my invention signed by me this 29th day of March, 1870.

JAMES H. DE POE.

Witnesses:
    GEO. W. MABEE,
    ALEX. F. ROBERTS.